D. W. LOVETT.
NUT LOCK.
APPLICATION FILED JUNE 2, 1906.
976,584.
Patented Nov. 22, 1910.
2 SHEETS—SHEET 1.
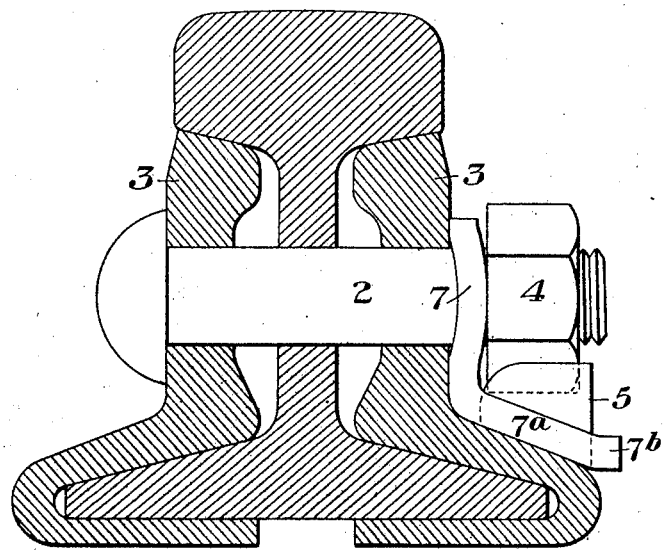
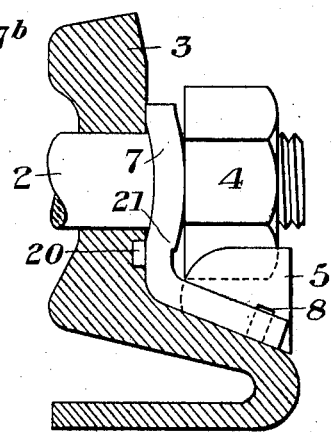
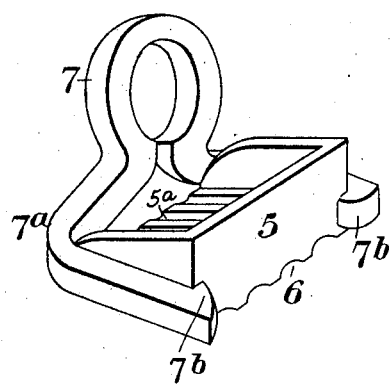
WITNESSES
R. A. Balderson.
Warren W. Swartz.
INVENTOR
D. W. Lovett,
by Bakewell & Byrnes,
his Attys.
THE NORRIS PETERS CO., WASHINGTON, D. C.

D. W. LOVETT.
NUT LOCK.
APPLICATION FILED JUNE 2, 1906.
976,584.
Patented Nov. 22, 1910.
2 SHEETS—SHEET 2.
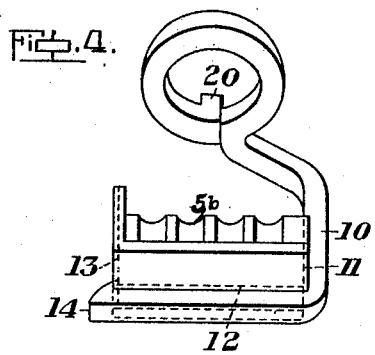
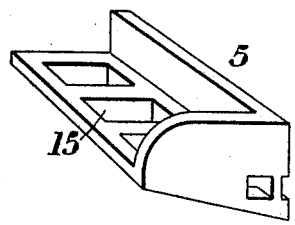
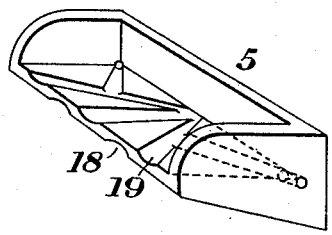
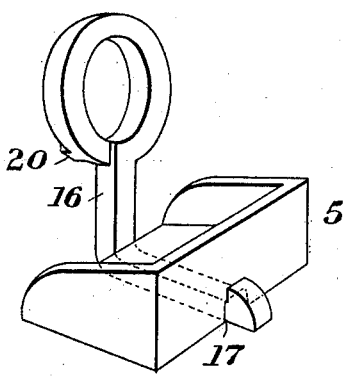
WITNESSES
R A Balderson
Warren W Swartz
INVENTOR
D. W. Lovett,
by Bakewell & Byrne,
his attys.
THE NORRIS PETERS CO., WASHINGTON, D. C.

UNITED STATES PATENT OFFICE.

DAVID WILLIAM LOVETT, OF ENSLEY, ALABAMA, ASSIGNOR OF ONE-HALF TO ALLAN C. RYAN, OF ENSLEY, ALABAMA.

NUT-LOCK.

976,584. Specification of Letters Patent. Patented Nov. 22, 1910.

Application filed June 2, 1906. Serial No. 319,845.

*To all whom it may concern:*

Be it known that I, DAVID WILLIAM LOVETT, of Ensley, Jefferson county, Alabama, have invented a new and useful Nut-Lock, of which the following is a full, clear, and exact description, reference being had to the accompanying drawings, forming part of this specification, in which:—

Figure 1 is a sectional view showing my invention applied to a rail joint; Fig. 2 is a perspective view; Fig. 3 is a detail view of a modification; Figs. 4, 5 and 6 are perspective views of other modifications; and Fig. 7 is a plan view of another form of the locking member.

My invention has relation to nut locks, and is designed to provide a simple and effective locking device which can be conveniently used with ordinary bolts and nuts, and wherever there is room for the insertion of a washer behind the nut.

Referring first to the construction shown in Figs. 1 and 2, the numeral 2 designates a bolt which secures the fish plates 3 of a rail joint and 4 is the usual nut. 5 designates a locking device which is of box-like form with front and end flanges, as shown in Fig. 2, and having a corrugated bottom portion 6. The upper surface of the bottom is also provided with grooves 5ª arranged to drain the water from the locking device. The corrugations may be upon both sides of the device if desired, or upon one side only. The device is arranged to fit the base flange of the splice bars 3, and receives therein the lower portion of the nut in the manner shown in Fig. 1, thereby securely holding the nut from turning. The locking device is held in place by means of a spring clamp or clip 7 which is formed with a spring washer portion arranged to fit over the bolt behind the nut and with the diverging spring arms 7ª having shoulders or hooks 7ᵇ at their ends which are arranged to embrace the locking device as shown. The arms 7ª instead of embracing the outer ends of the locking device may snap into apertures or slots 8 in the ends thereof as shown in Fig. 3. The locking device may also be modified in various other ways. Thus in Fig. 4 I have shown the clamp or clip as having but one arm 10 which is bent to embrace two sides of the locking member, the latter having the grooves 11 and 12 therein to receive said arm and the slot 13 in its end to receive the hook 14 at the free end of the arm. 5ᵇ are draining grooves in the upper face of the locking member. In this form one of the end flanges of the device is omitted, an end flange being used only at the end in the direction in which it is desired to prevent the nut from turning.

In the modification shown in Fig. 5, the corrugations on the locking member are omitted and the latter is formed with a number of vertical slots or openings 15 which lighten the device and also form drain openings for carrying off water.

In the modification shown in Fig. 6, the clamping device, instead of embracing a side or sides of the locking member is formed of a single arm 16 which extends underneath the locking member in a central groove 17 thereof. Fig. 7 shows another form of the locking member having corrugations 18 in its lower face and having its upper face provided with a plurality of draining grooves 19.

If desired the washer portion of the clamping device or clip may have a lug or projection 20 arranged to engage the fish plate or other part against which the washer seats to further hold it against movement. It may also be formed with the thickened portion 21 for holding the nut out of contact with the clamping arm or arms.

Various other modifications may be made without departing from my invention, since what I claim is:—

1. A nut lock consisting of a locking member seated on a flange extending from one of the elements to be held thereby, an end flange on said member arranged to engage a portion of the nut, an upwardly extending front flange on said member, and a clamp or clip carried by the bolt, and having a spring arm provided with a latch at the end thereof for engaging the locking member; substantially as described.

2. A nut lock comprising a flanged locking member seated on a flange extending from one of the elements to be held thereby, and arranged to receive a portion of the nut, a compressible spring washer having a downwardly and outwardly extending spring latch, having a hooked end arranged to engage and secure the locking member, the spring arm being arranged to rest on the flange extending from the element to be held by the nut; substantially as described.

3. A nut lock comprising a flanged locking member seated on a flange extending from one of the elements to be held thereby, an end flange on said member arranged to engage a portion of the nut, an upwardly extending front flange on said locking member, a compressible spring washer interposed between the nut and the element to be held thereby, the spring washer having a pair of downwardly and outwardly extending spring arms, and hooks on the ends of said arms arranged to engage and to hold the locking member in position on the flange of the element to be held thereby; substantially as described.

4. A nut lock having a locking member consisting of a piece having an end flange arranged to engage the nut and having its surface provided with drain passages; substantially as described.

In testimony whereof, I have hereunto set my hand.

DAVID WILLIAM LOVETT.

Witnesses:
  Z. T. WALKER,
  B. L. PULHAM.